United States Patent [19]

Ohe et al.

[11] Patent Number: 5,021,285

[45] Date of Patent: Jun. 4, 1991

[54] NON-WOVEN FABRIC SHEET FOR AGRICULTURAL USE

[75] Inventors: Tatsuya Ohe, Otake; Mitsuaki Fujimura, Iwakuni, both of Japan

[73] Assignee: Mitsui Petrochemical Industries, Ltd., Tokyo, Japan

[21] Appl. No.: 329,897

[22] PCT Filed: Jul. 2, 1988

[86] PCT No.: PCT/JP88100667

§ 371 Date: May 3, 1989

§ 102(e) Date: May 3, 1989

[87] PCT Pub. No.: WO89/00002

PCT Pub. Date: Dec. 1, 1989

[30] Foreign Application Priority Data

Jul. 3, 1987 [JP] Japan .................... 62-102569[U]

[51] Int. Cl.$^5$ .................... A01G 9/00; A01G 9/24; B32B 3/00; B32B 33/00
[52] U.S. Cl. .................... 428/195; 47/19; 47/28.1; 47/31; 428/288; 428/290; 428/296; 428/913
[58] Field of Search .............. 47/19, 28.1, 31, 17 MD; 428/195, 288, 290, 913

[56] References Cited

U.S. PATENT DOCUMENTS

| | | | |
|---|---|---|---|
| 3,738,956 | 6/1973 | Glatti et al. | 47/19 |
| 4,328,279 | 5/1982 | Meitner et al. | 428/195 |
| 4,587,154 | 5/1986 | Hotehkiss et al. | 428/195 |
| 4,603,077 | 7/1986 | Fujimoto et al. | 47/28.1 |
| 4,753,843 | 6/1988 | Cook et al. | 428/286 |

*Primary Examiner*—James C. Cannon
*Attorney, Agent, or Firm*—Birch, Stewart, Kolasch & Birch

[57] ABSTRACT

A nonwoven sheet for agricultural use made of a hydrophobic nonwoven fabric subjected to hydrophilic treatment in which a surfactant is applied to at least part of the surface of the hydrophobic nonwoven fabric, the sheet being characterized in that the hydrophilic treatment creates channels that allow water to pass from the obverse surface of the nonwoven fabric to the underside thereof and in that the percentage of water retention is within the range of 150 to 300 wt %. The provision of the channels enable water to rapidly pass from the obverse surface of the nonwoven sheet to the underside thereof, and the weight of the nonwoven fabric is not increased by water retention because of the percentage of water retention being small.

5 Claims, No Drawings

NON-WOVEN FABRIC SHEET FOR AGRICULTURAL USE

TECHNICAL FIELD

The present invention relates to a nonwoven sheet for agricultural use which is employed as a full-covering sheet for tunnel culture and outdoor culture.

BACKGROUND ART

Examples of known applications of nonwoven fabrics include various types of agricultural covering materials such as full-covering sheets for tunnel culture and outdoor culture.

Nonwoven fabrics composed of, for example, polyethylene terephthalate (PET) or polypropylene (PP) exhibit excellent heat retaining properties and permeability and their performance makes them suitable as nonwoven sheets for agricultural use. On the other hand, such nonwoven fabrics are basically composed of hydrophobic resins and thus have a tendency to allow rain water and so forth to collect on their surface because water does not easily pass therethrough. There is therefore a danger of creating a problem whereby crops being grown are crushed by the weight of waterdrops that have collected on the nonwoven fabric used in a certain form.

The inventors of the present invention developed a full-covering material for agricultural use made of a nonwoven fabric composed of hydrophobic fibers of 6 denier or more and having a METSUKE ( weight/m$^2$)amount of 10 to 30 g/m$^2$ and light transmittance of 85% or more as described in Japanese Patent Laid-Open No. 128955/1986.This material suffers from the same problem as that described above because it is composed of hydrophobic fibers.

An agricultural sheet composed of a nonwoven fabric which is subjected to hydrophilic treatment with a surfactant for the purpose of preventing water from collecting on its surface is known as a sheet that is capable of resolving the above-described problem. Such a hydrophilic-treated nonwoven fabric is subjected to hydrophilic treatment to a high degree so that any water in contact with the surface of the nonwoven fabric can pass therethrough as fast as possible from the obverse surface of the nonwoven fabric to the underside thereof. As a result, the hydrophobic property of the fibers which form the nonwoven fabric deteriorates and thus waterdrops held in the voids of the nonwoven fabric do not easily escape therefrom. This leads to a situation in which a significant increase in weight occurs in the nonwoven fabric due to the water retention phenomenon.

Although the danger that the growing crops will be crushed due to the increase in weight of the sheet because of water retention, is not as great as it is with the above-described nonwoven sheeet for agricultural use composed of a nonwoven fabric. In any event, is not possible to completely avoid this problem.

In the case of a hydrophobic nonwoven fabric, the water which collects on its surface can be easily removed by inclining the surface to allow it to run off, and thus any increase in the weight caused by this water can be ignored. On the other hand, since conventional hydrophilic-treated nonwoven fabrics exhibit a high percentage of water retention and the water held in the voids of the nonwoven fabric cannot be easily removed, the state of gradual increase in the weight continues for a long time. This leads to the problem that the increase in weight makes the work of removing the sheet very laborious.

When the sheet is rolled up and stored for reuse after it has been used, there is also a great danger that, since the rolled up nonwoven fabric has a form in which both of the roll ends are fixed, the nonwoven fabric is broken owing to shrinkage that occurs because of the drying that takes place during storage if the fabric has a high degree of water retention.

DISCLOSURE OF INVENTION

The present invention has been achieved with a view toward solving the aforementioned problem of conventional nonwoven sheets for agricultural use, and it is an object of the present invention to provide a nonwoven sheet for agricultural use which permits rainwater and the like to pass therethrough instead of collecting on the surface, and which does not present the disadvantage of crushing growing crops.

In other words, the present invention provides an agricultural sheet made of a hydrophobic nonwoven fabric subjected to hydrophilic treatment in which a surfactant is applied to at least part of the surface thereof, the sheet being characterized in that the hydrophilic treatment creates channels that allow water to pass from the obverse surface of the nonwoven fabric to the underside thereof, and in that the percentage of water retention is within the range of 150 to 300 wt %.

In the nonwoven sheet for agricultural use of the present invention, since the hydrophilic treatment creates channels that allow water to pass from the obverse surface of the nonwoven fabric to the underside thereof, rainwater is able to rapidly pass through the channels from the obverse surface of the nonwoven fabric to the underside thereof even if it comes into contact with the surface of the nonwoven fabric during rain without collecting on the surface thereof. Furthermore, since the percentage of water retention is as low as being within the range of 150 to 300 wt % (the method of measuring the percentage of water retention being described below), there is no danger of the crops being crushed due to the increase in weight of the nonwoven fabric that is caused by water retention.

BEST MODE FOR CARRYING OUT THE INVENTION

The nonwoven fabric used in the present invention is composed of hydrophobic fibers. One determines whether the fibers comprising a nonwoven fabric are hydrophobic by, for example, measuring the percentage water absorption. In other words, the percentage water absorption is measured using a fiber having a given length, a fiber block having a given weight or a nonwoven fabric having a given area, in accordance with the Japanese Industrial Standard JIS K 7209. If the percentage of water absorption is 1% or less, the nonwoven fabric is regarded as being hydrophobic. In the present invention, any fiber may be used as long as it exhibits a percentage of water absorption of 1% or less.

In the present invention, therefore, polyolefin fibers such as polyethylene fibers, polypropylene fibers and the like and polyester fibers such as polyethylene terephthalate fibers and the like are preferably used, and particularly preferable are polyolefin fibers exhibiting low percentages of water absorption. In particular, polyolefin spun-bonded nonwoven fabrics are preferably used from the viewpoint of productivity, bulk and strength.

The above-described hydrophobic-treated nonwoven fabric is subjected to hydrophilic treatment by applying a surfactant to at least part of the surface thereof. This hydrophilic treatment causes channels to be formed which allow water to pass from the obverse surface of the nonwoven fabric to the underside thereof. These channels need not be formed over the whole portion. Thus, the whole portion need not be subjected to hydrophilic treatment. It is sufficient to form the channels over just part of the surface area at suitable intervals. For example, the nonwoven fabric may be formed into an elongated shape, and hydrophilic treatment may be carried out in a lengthwise direction thereof so as to form a plurality of channels arranged in parallel in the widthwise direction. Alternatively, hydrophilic treatment may be performed in the widthwise direction of the bandshaped nonwoven fabric so as to form a plurality of channels. In this manner, when the hydrophilic treatment is imparted with a directional property, the water adhering to the nonwoven fabric can be guided in the direction of the hydrophilic treatment.

The nonwoven sheet for agricultural use of the present invention is made of a nonwoven fabric which is subjected to hydrophilic treatment and which has a percentage water retention of 150 to 300 wt %, preferably 150 to 200 wt %. If the percentage of water retention is 150 wt % or less, the hydrophilic treatment is not sufficient, and water thus collects on the obverse surface of the nonwoven fabric and does not pass therethrough to the underside thereof. If the percentage water retention is 300 wt % or more, there is a danger of the crops being crushed due to the significant increase in weight of the nonwoven fabric that is caused by water retention.

Examples of surfactants that may be used in performing the hydrophilic treatment include surfactants of the polyethylene alkylphenol type, alkylsulfate type, aliphatic type, alkylethanolamine type and polyoxyethylene ether type. The polyoxyethylene ether type of surfactant is particularly preferable.

It is also preferable to ensure that the surfactant is provided with functional permanence by incorporating 20 to 70 wt % of a binder exhibiting high adhesion properties. An example of such a binder is a water-soluble acrylic resin.

A preferable example of the present invention is described below.

Table 1 shows a comparison between a nonwoven fabric obtained by hydrophilic treatment of a spunbonded nonwoven fabric composed of polypropylene fibers of 8 denier and having METSUKE of 20 g/m² so that the percentage of water retention came within the range of the present invention, a nonwoven fabric as a comparative example which was not subjected to hydrophilic treatment, and a conventional hydrophilic-treated polyethylene terephthalate nonwoven fabric.

Example 1 is a nonwoven fabric to which an aqueous solution of 2 wt % surfactant was applied with a spray discharge of 15 g/m², and Examples 2 and 3 are nonwoven fabrics to which an aqueous solution of 3 wt % surfactant was applied in ratios of 4.2 g/m² and 5 g/m², respectively. The percentage water retention of each of the fabrics was measured as the absolute value obtained by dipping each nonwoven fabric in water at 23° C. for 5 minutes, naturally dewatering each nonwoven fabric for 1 minute by allowing it to stand on a wire mesh inclined at 45°, forcibly dewatering each nonwoven fabric by lifting and shaking it several times, and then calculating the percentage water retention using the following equation:

$$\text{Percentage water retention (\%)} = \frac{(\text{Weight after dewatering} - \text{Initial weight}) \times 100}{\text{Initial weight}}$$

TABLE 1

| | Example | | | Comparative Example | | |
|---|---|---|---|---|---|---|
| | 1 | 2 | 3 | 1 | 2 | 3 |
| Material | PP | PP | PP | PP | PET | PET |
| Thickness of fiber (denier) | 8 | 8 | 8 | 8 | 3 | 2 |
| METSUKE (g/m2) | 20 | 20 | 20 | 20 | 15 | 15 |
| Presence of hydrophilic treatment | Treated | Treated | Treated | Not treated | Treated | Treated |
| Passage of water collecting on the surface | Passing | Passing | Passing | Not passing | Passing | Passing |
| Percentage of water retention (%) | 170 | 180 | 190 | 100 | 500 | 500 |

Each of the agricultural nonwoven sheets of Example 2 and Comparative Examples 1 to 3 shown in Table 1 were used in a tunnel culture application, and water was intentionally sprayed on each of the nonwoven sheets using a shower. In the case of Comparative Example 1, most of the water collected on the surface, and thus the nonwoven sheet used sagged owing to the weight of the water, leading to a crushing of the crops being grown in the tunnel at certain portions. On the other hand, in the case of any of Example 2 and Comparative Examples 2 and 3, the water passed from the obverse surface of the nonwoven to the underside thereof, so that no crushing of the crops being grown occurred.

When each of these sheets was removed, the ease of removal was poor in the case of Comparative Examples 2 and 3 owing to the increase in weight of the sheets caused by water retention; while the sheet of Example 2 could be removed easily because substantially no increase in weight occurred.

As described above, when the nonwoven sheet for agricultural use of the present invention is used as a tunnel for agricultural growing in a greenhouse or is used for full covering of crops, waterdrops are able to pass through the hydrophilic channels and escape, so there is no problem of growting crops being rcushed owing to the weight of rainwater collecting on the sheet. In addition, since the percentage water retention is within the range of 150 to 300 wt %, the weight of the sheet is never greatly increased, and there is therefore no danger of growing crops being crushed by the sheet breaking.

INDUSTRIAL APPLICABILITY

Although the agricultural nonwoven sheet of the present invention is suitable as a tunnel for agricultural growing in a greenhouse or for full covering of crops, the agricultural applications of the sheet are not limited to these purposes, and the sheet can also, for example, be used for providing heat insulation for growing crops.

What is claimed is:

1. A nonwoven sheet for agricultural use comprising a hydrophobic nonwoven fabric which has been subjected to hydrophilic treatment which comprises applying a surfactant to at least part of the surface of said hydrophobic nonwoven fabric, said sheet being characterized in that said hydrophilic treatment creates channels that allow water to pass from the obverse surface of said nonwoven fabric to the underside thereof and in that the percentage of water retention is within the range of 150 to 300 wt %.

2. The nonwoven sheet for agricultural use according to claim 1, wherein said hydrophobic nonwoven fabric is a polyolefin spun-bonded nonwoven fabric.

3. The nonwoven sheet for agricultural use according to claim 1, wherein said hydrophobic nonwoven fabric is formed into an elongated shape and a plurality of hydrophilic treatment portions are provided on said nonwoven fabric in the form of a band or line in the widthwise direction thereof.

4. The nonwoven sheet for agricultural use according to claim 1, wherein said hydrophobic nonwoven fabric is formed into an elongated shape and a plurality of hydrophilic treatment portions are provided on said nonwoven fabric in the form of a band or line in the lengthwise and widthwise directions thereof.

5. The nonwoven sheet for agricultural use according to claim 1, wherein said nonwoven fabric is treated with a surfactant containing 20 to 70 wt % of a binder.

* * * * *